United States Patent

[11] 3,559,583

[72] Inventor Lucin Felix Chadenson
        Paris, France
[21] Appl. No. 719,370
[22] Filed Apr. 8, 1968
[45] Patented Feb. 2, 1971
[73] Assignee Safege Transport
        Paris, France
        a company of France
[32] Priority Apr. 10, 1967
[33] France
[31] 102,110
        1,526,158

[54] OVERHEAD RAILWAY
    5 Claims, 3 Drawing Figs.
[52] U.S. Cl. ..................................................... 104/89,
                                                               104/23
[51] Int. Cl. ..................................................... B61b 3/00,
                                                               B60v 1/00
[50] Field of Search .......................................... 104/89,
                                                 147, 148; 104/23FS, 89

[56] References Cited
        UNITED STATES PATENTS
3,168,875  2/1965  Reed .......................... 104/23(FS)
3,225,228  12/1965  Roshala ...................... 104/23(FS)

Primary Examiner—Arthur L. La Point
Assistant Examiner—Richard A. Bertsch
Attorneys—Frank L. Neuhauser and Walter C. Bernkopf

ABSTRACT: An overhead railway system wherein a car body is suspended from a plurality of bogie trucks traveling in a boxlike beam having a longitudinally extending slot in its lower face. The trucks are supported and propelled by a plurality of pneumatic tired wheels in running engagement with horizontal tracks defined by the upper surfaces of the flanges adjacent to the slot. High-speed operation is improved by reducing the tire load while maintaining adequate tire adherence for propulsion and braking. This is achieved by means of air cushion members supported by the trucks and arranged so that their lower faces are substantially parallel to the horizontal tracks. Alternatively the lifting force may be provided by magnetic members secured to the trucks and acting against either the horizontal track or the upper surface of the boxlike beam.

PATENTED FEB 2 1971   3,559,583

INVENTOR.
LUCIEN FELIX CHADENSON
BY Walter C. Bernkopf
HIS ATTORNEY

OVERHEAD RAILWAY

In prior French patents, notably Nos. 1,072,538 of Dec. 18, 1952 and 1,068,532 of Dec. 28, 1952 the Applicant described and illustrated a railway system of the suspended or overhead type wherein the car bodies are disposed beneath the bogie trucks to which they are connected by means of suspension members.

The track of this railway system normally running well above the ground consists of a box-sectioned beam in which the bogie trucks or trolleys are caused to roll, a longitudinal slot being provided centrally of the lower portion of the beam to permit the passage of the suspension members interconnecting the bogie trucks and the car bodies.

It is the object of the present invention to widen the field of operation of overhead railway systems of this character by permitting the high-speed operation thereof, for example above 125 m.p.h. or 200 km.p.h. without departing from the use of wheels equipped with pneumatic tires for propelling and supporting the trains.

At these relatively high speeds the loads consistent with a normal useful tire life and adapted to be supported by each type of the carrier wheels are but only one fraction—decreasing with the speed—of the load value normally admitted in the case of considerably lower speeds.

Thus, the unitary load of pneumatic tires can be halves by equipping each carrier axle with paired wheels, as disclosed in the first one of the aforesaid patents No. 1,072,538.

The unitary load of pneumatic tires may also be reduced by increasing the number of axles per bogie truck, in combination or not with the above proposition concerning the paired wheels.

It is the essential object of the present invention to provide an overhead railway system adapted to be operated at relatively high speeds, above 125 m.p.h. or 200 km.p.h., while maintaining the use of pneumatic tires for supporting and propelling the train, by reducing the unitary tire load, this railway system being characterized in that it comprises other carrier means than said tires wheels for supporting one fraction of the load which the wheels would not be capable of supporting without showing an abnormal and premature tire wear, at the high-speed values contemplated.

However, the loads thus reduced at high speeds, which are still supported by the carrier wheels, must necessarily be sufficient to permit the proper braking of these carrier wheels in spite of the loss of wheel adherence at high speeds.

Similarly, the loads thus reduced at high speeds, which are still supported by the driving wheels must also be sufficient to permit an adequate drive through the driving axles alone, in spite of a loss of adherence and the increased drag at high speeds.

The other supporting means mentioned hereinabove may notably consist of air cushions directed against the tracks, attractive or repulsive magnetic fields built up between the tracks and the cars, and more particularly the bogie trucks thereof, fairing means capable at the speeds contemplated to impart thereto the whole or part of the necessary lift, and more generally any adequate device capable of imparting to the railway vehicles the additional lift required at these higher speeds, these various means being used separately or in combination, if desired.

According to another feature characterizing the present invention, the action produced by the suitable lift means broadly set forth hereinabove is responsive to the load and speed parameters of the vehicles, so as to be limited at any time to the proper value and cause at a given speed the necessary reduction in the load supported by the carrier tires while maintaining the wheel adherence necessary for propelling and braking the cars.

In order to afford a clearer understanding of this invention a typical form of embodiment thereof will now be described with reference to the accompanying drawing, in which.

Figure 1:
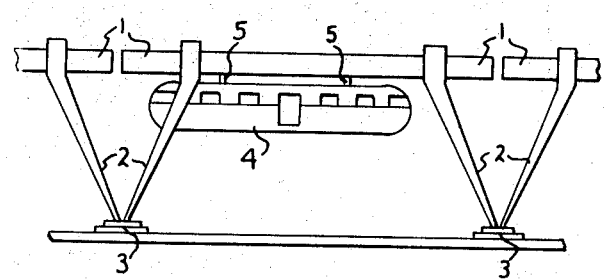
FIG. 1 is a side elevational and diagrammatic view of an overhead railway system to which the present invention is applicable.

The overhead railway system outlined in FIG. 1 comprises, as already explained in the aforesaid former patents of the same applicant, a track consisting of a continuous series of sections 1 supported by gantries or posts 2 having their lower ends embedded in base blocks 3 disposed at spaced intervals in the underlying ground; the train cars or vehicles 4 are supported by suspension members 5 secured to bogie trucks 6 rolling inside the track consisting of said track section 1.

Figure 2:
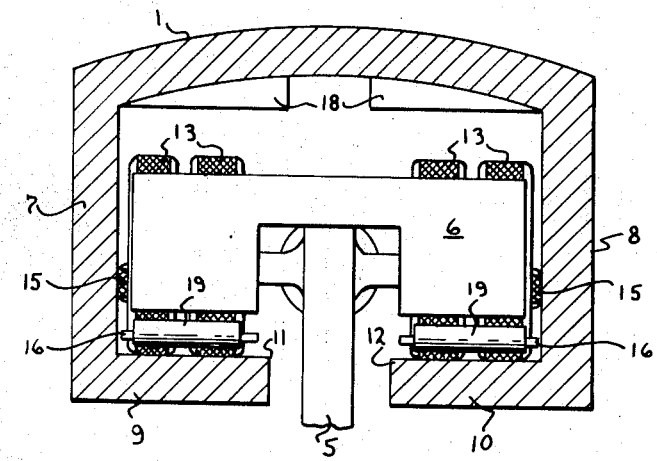
FIG. 2 is a cross section showing on a larger scale a bogie truck and the box-sectioned beam constituting the track therefor.
Figure 3:
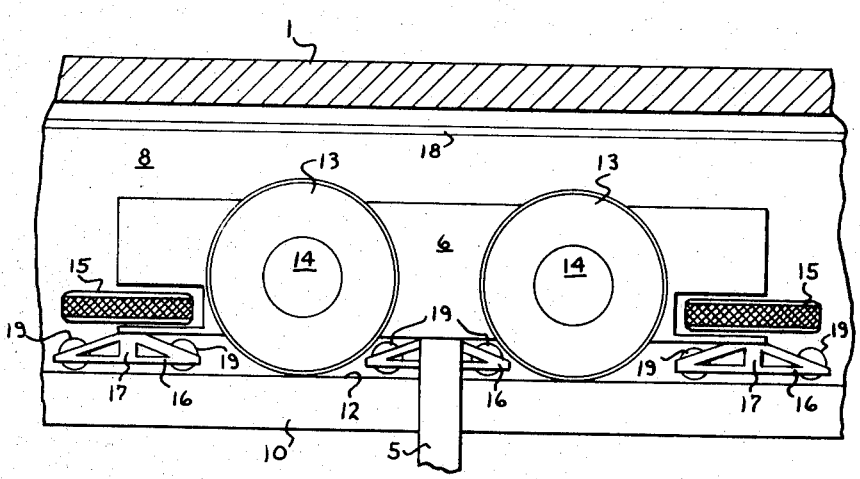
FIG. 3 is a diagrammatic longitudinal section of the track, with the bogie truck and the means for suspending a car therefrom.

These track sections 1 consist of box-sectioned beams comprising as shown in FIG. 2 lateral opposite L-sectioned members 7, 8 of which the horizontal flanges 9, 10 constitute with their upper faces 11, 12 the tracks proper for the carrier wheels 13 of the vehicle trucks 6. These wheels, paired or not are equipped with pneumatic tires.

The bogie trucks 6 of the vehicles comprise a frame in which axles 14 are mounted. At either end of each frame guide wheels 15 are mounted for free rotation about vertical axes and engage the inner, substantially vertical surfaces of the aforesaid L-sectioned members 7, 8 in order to keep the bogie truck centered on its track. These guide wheels 15 are also fitted with pneumatic tires.

Supporting shoes 16 are secured by means of arms 17 to the frame of the bogie trucks, with or without the interposition of resilient pads.

These supporting shoes, of which the lower face is parallel to the upper surfaces 11 and 12 of the track supporting the carrier wheels 13, may be provided with adequate means for creating air cushions between said shoes and said upper surfaces 11, 12, whereby, due to the forced flow of a fluid under controlled pressure conditions, a certain lift is produced; these shoes 16 may alternately consist of magnetic plates producing the same lift action by repulsive magnetic reaction with respect to said upper surfaces 11 and 12 provided with adequate electric means.

Another possible form of embodiment consists in mounting these magnetic supporting shoes on the upper portion of the bogie truck and causing a mutual attraction between said shoes and metal strips connected to adequate electric means and secured at 18 to the roof or upper inner surface of the box-sectioned beam 1, parallel to the upper surfaces 11 and 12 of the track receiving the carrier wheels 13.

If these supporting shoes are disposed under the bogie trucks, they can be equipped or not with safety rollers 19 adapted for example to engage the corresponding upper track surfaces 11 and 12 in the occurrence either of a failure in the supporting system or of an excessive overload of the vehicle, another possible cause of abnormal operation in which these rollers constitute safety elements being a puncture or a loss of air pressure in the tires of the corresponding carrier wheels 13, or a reduction in the load supporting capacity of said tires in case of abnormally high speeds.

Of course, the specific form of embodiment of the present invention which is described hereinabove with reference to the accompanying drawing is given by way of example only and should not be construed as limiting the present invention, since many modifications and variations may be resorted to without departing from the spirit and scope of the invention.

Thus, notably, additional lift may be produced by using the fairing of the bogie trucks, fins mounted on the vehicle bodies and retractable or not therein, and the fairing of the vehicle bodies themselves. The above-mentioned truck fairing further advantageous in that it provides a convenient means for producing a forced ventilation and an efficient tire cooling effect; besides, the air flow produced by air cushions may also be used for the same purpose.

I claim:

1. In an overhead railway system having an elevated box-sectioned beam comprising a roof and opposed L-sectioned members terminating in horizontal flanges defining a longitudinal slot, a plurality of bogie trucks adapted to travel longitudinally within said beam, and a car body suspended below said beam and secured to said trucks by a plurality of suspension members extending through said slot, the combination comprising:

a. a plurality of wheels secured on the lateral sides of the truck for rotation about a horizontal axis;

b. each of said wheels bearing pneumatic tires maintained in running engagement with the upper surfaces of said horizontal flanges;

c. means for driving and braking a plurality of said wheels whereby said wheels provide propulsion and braking of said bogie truck during operation;

d. a plurality of shoe members secured to said bogie truck;

e. said shoe members having lower faces arranged to be adjacent and substantially parallel to the upper surfaces of said horizontal flanges and providing a lifting force between said shoe members and the upper surfaces of said horizontal flanges proportioned to reduce the load on said tires at high-speed operation while maintaining adequate wheel loading to provide propulsion and braking of said truck by means of said tires.

2. The arrangement set forth in claim 1, wherein said shoe members produce an air cushion directed against the upper surfaces of said horizontal flanges.

3. The arrangement set forth in claim 1, wherein said shoe members comprise magnetic means for generating a magnetic field between said shoe and the upper surfaces of said horizontal flanges.

4. The arrangement set forth in claim 1 wherein said shoe members are equipped with safety rollers adapted to engage the upper surfaces of said horizontal flanges under predetermined conditions, such as system overload.

5. In an overhead railway system having an elevated box-sectioned beam comprising a roof and opposed L-sectioned members terminating in horizontal flanges defining a longitudinal slot, a plurality of bogie trucks adapted to travel longitudinally within said beam and a car body suspended below said beam and secured to said trucks by a plurality of suspension members extending through said slot, the combination comprising:

a. a plurality of wheels secured on the lateral sides of the truck for rotation about a horizontal axis;

b. each of said wheels bearing pneumatic tires maintained in running engagement with the upper surfaces of said horizontal flanges;

c. means for driving and breaking a plurality of said wheels, whereby said wheels provide propulsion and braking of said bogie truck during operation;

d. metallic members secured to the interior surface of the roof of said box beam;

e. means for causing mutual magnetic attraction between said aforesaid members proportioned to reduce the load on said tires at high-speed operation while maintaining adequate wheel loading to provide propulsion and braking of said truck by means of said tires.

PO-1050
(5/69)

United States Patent Office
CERTIFICATE OF CORRECTION

Patent No. 3,559,583                            Dated February 2, 1971

Inventor(s) Lucien Felix Chadenson

It is certified that error appears in the above-identified patent and that said Letters Patent are her corrected as shown below:

Inventor's name in heading "Lucin" should read -- Lucien--;

In the Claims Column 4, Line 19 reading c. means for driving and "breaking" should read c. means for driving and --braking--.

Signed and sealed this 11th day of May 1971.

(SEAL)
Attest:

EDWARD M. FLETCHER, JR.               WILLIAM E. SCHUYLER, JR.
Attesting Officer                           Commissioner of Patents